Dec. 16, 1952     H. G. LIEN ET AL     2,621,715
PIVOTALLY MOUNTED AXIALLY TRAVELING TIRE REMOVING TOOL
Filed Feb. 9, 1948
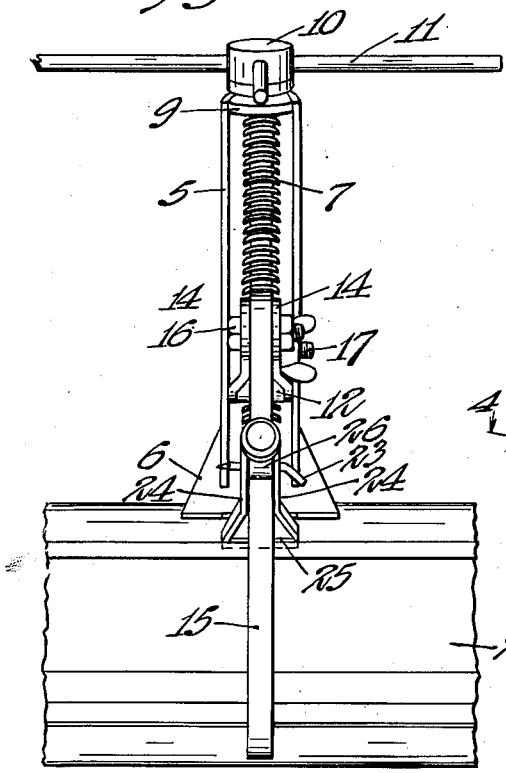
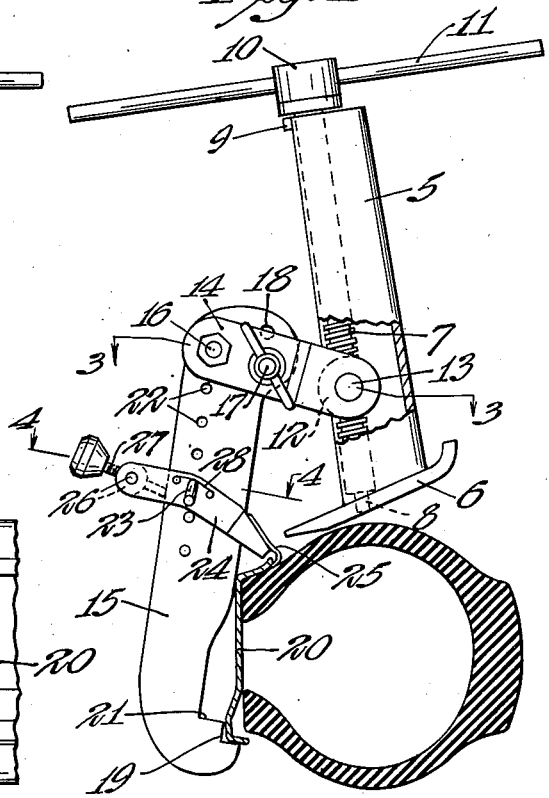
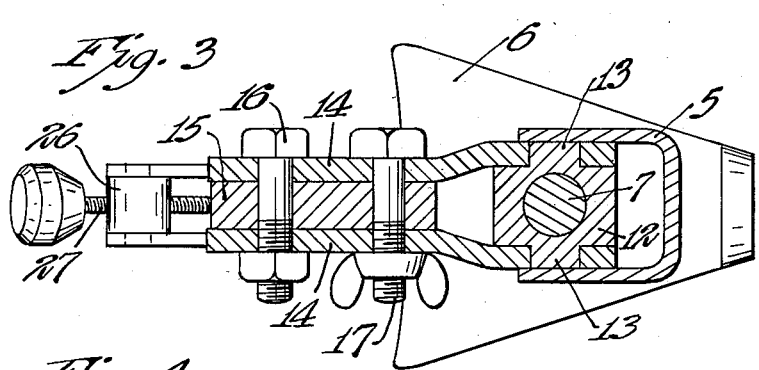
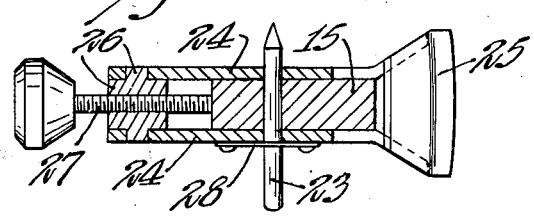
Inventors
Walter A. Bishman
Harold G. Lien
By Williamson & Williamson
Attorneys Patented Dec. 16, 1952

2,621,715

UNITED STATES PATENT OFFICE 2,621,715

PIVOTALLY MOUNTED AXIALLY TRAVELING TIRE REMOVING TOOL

Harold G. Lien and Walter A. Bishman, Minneapolis, Minn., assignors to George C. Carlson, Chetek, Wis.

Application February 9, 1948, Serial No. 7,046

2 Claims. (Cl. 157—1.26)

This invention relates to pneumatic tire casing removing tools.

The invention is particularly adapted for removing heavy and comparatively stiff pneumatic tire casings from relatively large vehicles such as trucks, heavy earth-moving machinery, and the like.

In considering the invention in the automotive truck field, it happens that most truck rims are not collapsible nor do they have drop centers, which latter rim constructions are not feasible for larger and heavier types of tires. This is true because truck tires today are generally constructed with a very stiff bead and always with wire cables extending annularly through the beads of the casings. For this reason the rims for trucks generally have a flat base instead of the clincher type rim so as to facilitate the removal of the tires. Even with a flat base rim, it is imperative that the pressure for removing the tire be applied as closely as possible to the rim itself. If any substantial pressure is applied to the side wall of the tire away from the rim, the tire will tend to roll and thereby cause the aforementioned casing beads to wedge the tire even more tightly to the rim. However, if the pressure is applied to the tire in the area next to the rim, this binding will not occur. Truck tires are dismounted by removing a retaining ring at one edge of the rim and forcing the casing axially from the side of the rim from which the retaining ring has been removed. When a casing has been on a rim for some time it tends to stick and is extremely difficult to remove.

It is an object of the present invention to provide a relatively light and readily portable tool which functions efficiently to force the casing axially from the rim after the bead retaining ring has been removed.

The above and other objects and advantages of the invention will more fully appear from the following description made in connection with the accompanying drawing wherein like reference characters refer to the same parts throughout the views, and in which:

Figure 1 is a side elevational view of the device in position on a rim and tire unit, the latter being shown in section;

Figure 2 is an end elevational view;

Figure 3 is an enlarged section taken approximately on the line 3—3 of Figure 1; and Figure 4 is an enlarged section taken approximately on the line 4—4 of Figure 1.

In the drawing there is shown a shank 5 which in Figure 3 is shown to be U-shaped in cross section. Its lower end is provided with a base plate 6, which slants downwardly and outwardly at one side of the shank 5. Extending longitudinally in the shank is a screw 7 whose lower end is reduced as at 8 and journaled in the base plate 6, and whose upper end is journaled in an upper end piece 9. The screw extends through the end piece 9 and is provided with a head 10 which carries a T handle 11.

Threaded on the screw 7 is a follower block 12 having oppositely extending bosses 13 which pivotally support a pair of spaced links or connector plates 14. Between the ends of the plates 14 is positioned the upper end of a wheel rim engaging member 15, connection being made by a pair of bolts 16 and 17, which pass through the links 14 and the upper end of the member 15. An aperture 18 adjacent the bolt 17 is adapted to selectively receive said bolt so that the angle of the member 15 relative to the plates 14 can be adjusted.

The rim engaging member 15 at its lower end is provided with an angular notch 19 which is adapted to fit the edge of a rim 20 as shown in Figure 1. Adjacent the notch is another notch 21 which can be used to receive the edge of an opening through a disk wheel for anchoring the member 15 when the material of the disk wheel makes it impossible for the notch 19 to receive the side of a rim as shown in Figure 1.

The rim engaging member 15 is provided with a line of apertures 22 which are adapted to selectively receive a pin 23 which also passes through the two arms 24 of an upper rim edge engaging unit. Said arms 24 at one end are connected by a hook-like plate 25 which fits over the upper side edge of the rim as shown in Figure 1. The opposite ends of the arms 24, which lie at either side of the member 15, are connected by a spacer 26 through which is threaded a bolt 27, said bolt being adapted to bear against the adjacent edge of the rim engaging member 15 as shown in Figures 1, 3 and 4. For a rough adjustment to different rim widths the arms 24 are moved longitudinally of the member 15 and the retaining pin 23 is then inserted in the desired aperture 22, said pin being releasably secured against removal by a small bar spring 28 carried by one of the arms 24 and the upper rim side engaging hook 25 can be secured by turning the screw 27 toward or away from the adjacent edge of the member 15.

With the device in the position shown in Figure 1, the screw 7 can be rotated by means of the handle 11, forcing the screw and shank 5 with its base plate 6 downwardly against the side wall of the tire casing, the tool being firmly anchored to the wheel rim. When a slight amount of pressure has been exerted against the side wall of the casing, a slight opening will be formed between the outer and upper edge of the flat rim 20 (as shown in Fig. 1) and the bead of the tire. This permits the user to drive the base plate 6 inwardly toward the member 15 and between the rim edge and the bead with a hammer or similar driving object until the inner edge of the base plate 6 registers with the vertical portion of the rim 20. This operation may be effected in steps, if desired. Thereafter, as the handle 11 is turned, the thrust of the base plate 6 is necessarily applied, because of its orientation relative to the rim, to the bead of the tire and adjacent the rim itself. This precludes the possibility of the tire rolling and its consequent binding to the rim. Obviously, the tool can be easily made to force the casing from the rim even though the tire casing fits tightly or may have rusted in its mounted position.

It is important that the line of thrust applied by the screw 7 and its base plate 6 be parallel to the member 5 or that it be directed inwardly toward the wheel rim engaging member 15. This prevents the shoulder formed by the notch 19 from slipping off the rim 20 and thereby maintains the plates 14 in a fixed position relative to the rim.

It will, of course, be understood that various changes may be made in the form, details, arrangement and proportions of the various parts without departing from the scope of our invention.

What we claim is:

1. A tire removing tool comprising a shank having a base adapted to engage a tire side wall, a rim engaging member, single-pivot means for connecting said member to said shank for forced longitudinal movement relative thereto, said means including linkage structure mounted on said member and extending angularly thereto and having said single pivot connection with said shank laterally offset relative to said member to permit swinging movement of said shank about an axis disposed angularly relative to the longitudinal axis of said member to a position where said base of the shank engages the bottom of the rim, and means associated with said shank for positively moving said rim engaging member longitudinally of said shank.

2. A tool for removing tires from relatively flat based rims comprising a rim engaging member, linkage structure mounted upon said member and extending angularly thereto to a point laterally offset relative to said member, a follower block pivotally mounted on said linkage structure on an axis transverse thereto and to said member and laterally offset relative to said member, a screw extending through said follower block in threaded driving connection for forced longitudinal movement therethrough and with respect to said member, a hollow rigid shank surrounding said follower block and journaled adjacent each its ends upon said screw to prevent longitudinal movement with respect thereto and having a base portion adapted to engage a tire side wall and a top portion and having a slot formed in its walls to permit movement of said follower block and linkage structure longitudinally thereof, and means for turning said screw, whereby said base portion may be caused to engage the tire side wall and remove the same from such a rim while engaged by said member.

HAROLD G. LIEN.
WALTER A. BISHMAN.

REFERENCES CITED

The following references are of record in the file of this patent:

UNITED STATES PATENTS

| Number | Name | Date |
|---|---|---|
| 1,116,468 | Nelson | Nov. 10, 1914 |
| 1,278,283 | Adamson et al. | Sept. 10, 1918 |
| 1,439,381 | Safstrom | Dec. 19, 1922 |
| 1,475,518 | Snider | Nov. 27, 1923 |
| 1,498,816 | Smith et al. | June 24, 1924 |

FOREIGN PATENTS

| Number | Country | Date |
|---|---|---|
| 27,864 | Great Britain | Dec. 7, 1906 |
| 367,841 | France | Sept. 18, 1906 |
| 765,192 | France | Mar. 19, 1934 |